Feb. 14, 1939.   G. A. F. WINCKLER   2,147,116
GENERATOR FOR EMERGENCY LAMPS
Filed Feb. 11, 1936
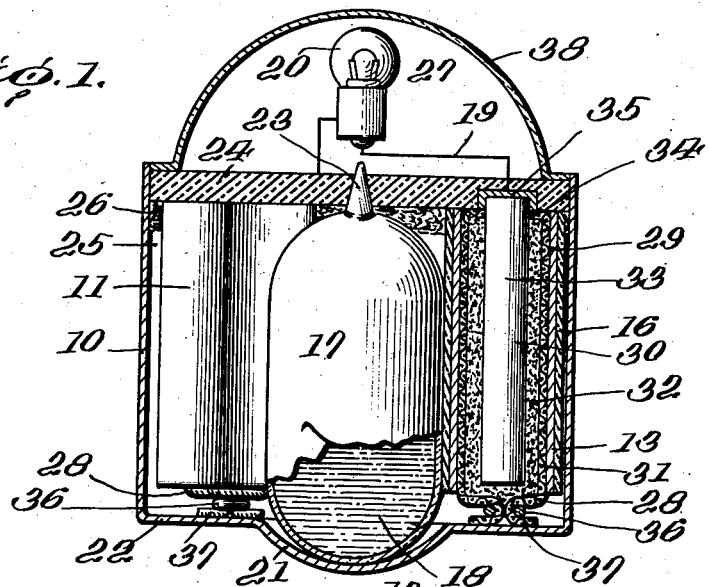
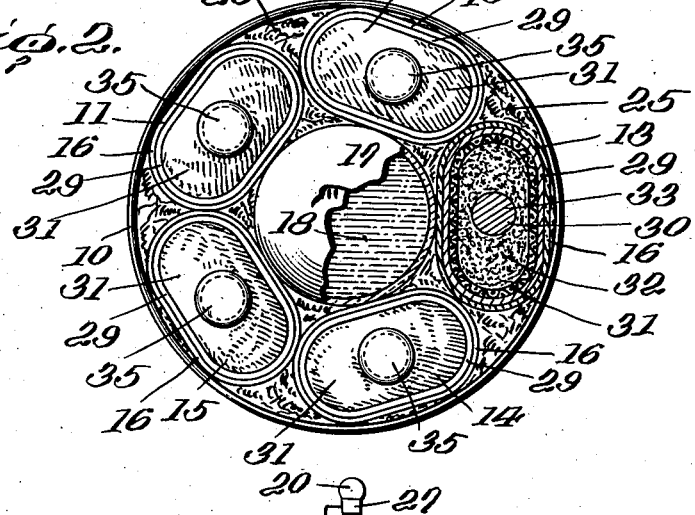
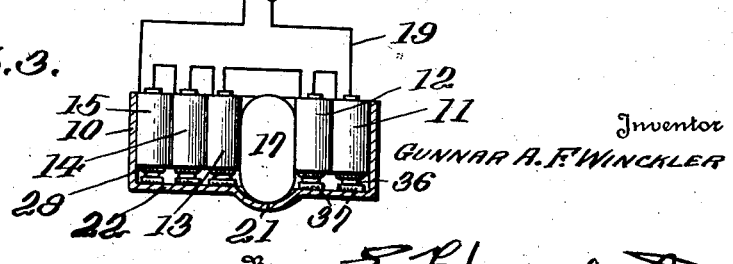
Inventor
GUNNAR A. F. WINCKLER Patented Feb. 14, 1939

2,147,116

UNITED STATES PATENT OFFICE 2,147,116

GENERATOR FOR EMERGENCY LAMPS

Gunnar A. F. Winckler, Worcester, Mass., assignor to Winckler Engineering Laboratories Incorporated, Boston, Mass., a corporation of Massachusetts Application February 11, 1936, Serial No. 63,423

7 Claims. (Cl. 136—113)

My invention relates to improvements in multi-cell generators for energizing lamps of which the following is a specification:

My invention consists, in part, of an emergency lamp in combination with an electrical generator, preferably of the multi-cell type, for energizing the electrical circuit for said lamp, the cell or cells of said generator being so disposed as to encompass a container of electrolyte, formed of vitreous or other frangible, non-corrosive material, which container when broken will energize the generator and cause the lamp to come into operation.

The invention further resides in a distribution system for the electrolyte, consisting of an absorbent material located between the electrodes of each cell of the generator and completely surrounding the positive electrode, the lower end of the absorbent material resting on the bottom of the lamp casing. When the container of the electrolytic fluid is broken, the electrolyte is absorbed by the absorbent material and is carried by it to all parts of the generator, thereby energizing the cells thereof, the individual cells preferably being connected in series for increasing the voltage across the electrical circuit.

The invention further consists of details of construction of a compact lamp with all its parts sealed to prevent them from being dismantled.

The invention further consists of a multi-cell electrical generator encompassing a liquid-tight container of electrolyte which ensures that the generator will remain dry when not in use, thus guaranteeing infinite shelf-life and ready operation when desired.

An object of my invention is to provide a multi-cell emergency generator for lamps, having infinite shelf-life, and which can be readily energized when needed by an activator, which generator is inexpensive, durable and always ready for emergency service.

One at-present-preferred form is shown by way of example in the accompanying drawing, taken in connection with the following description.

Referring to the figures:

Fig. 1 is a vertical cross-section of the lamp casing, one of the generators being in section, and the view showing the relation of the self-contained members to each other.

Fig. 2 is a plan of the generator, with the sealing member, lamp and globe removed.

Fig. 3 is a diagram of connections.

Referring to the drawing, which illustrates the improved emergency lamp having a multi-cell electrical generator for providing a voltage across an electrical circuit in accordance with the number of cells used, the generator and lamp are shown as provided with a casing 10 in which are located a plurality of generating cell units 11, 12, 13, 14, and 15. Each cell unit preferably is sheathed with insulating material 16 which electrically insulates one cell unit from the other, so that physically they can be closely packed together, while remaining electrically insulated, a construction which is necessary to the satisfactory operation of the device. These cells may be disposed in a circle around the inner surface of the casing 10 and are shown as encompassing a container 17 for electrolyte, which container preferably is made of vitreous or other frangible material, and in which container the electrolyte 18 is located, so that when the container is broken, the electrolyte 18 spreads to and energizes the individual cells 11—15 inclusive, and hence the electrical circuit 19 and the load, such as the lamp 20. The bottom of the container 17 rests on the bottom 22 of the container 10, which as shown, may be made in the form of a bulbous member 21 extending below and formed integral with the said bottom 22 of the casing 10. There is preferably provided, integral with the container 17, an upwardly extending projection 23 which is shown as held by means such as the sealing disc 24. The container 17 is broken by a downward pounding action against the bulbous member 21, which causes the latter to be dented and forced upwardly, thereby fracturing the frangible container 10 and allowing the electrolytic fluid to flow out and be absorbed by the material which carries it into the various cells. The bulbous member 21 may properly be the activating means for releasing the electrolytic fluid to energize the cells, and the broken container serves as an indicator to indicate the condition of the cells or to act as a warning that the cell has been used.

Series-connecting the cells across the electrical circuit increases the voltage thereacross, as well as increasing the candle power of the lamp or the electric pressure across any other load, in accordance with the number of cells used. A lamp of this type may remain idle for an indefinite period of time but will always and invariably be in condition for instant use. The lamps, if such the devices be, may be placed in a convenient location on a boat, truck or the like, and they will remain there in good workable condition over an indefinite period of time and will invariably be usable when needed. This requirement places a premium on the infinite shelf-life of the lamp and generator, and the ability of the device to come instantly into service. The device can be brought into operation instantly when needed; and from the condition of the container 17, it can readily be determined whether a new lamp should be placed in position for emergency service.

The cells and the electrolytic container fit closely into the casing 10, leaving spaces 25 (Figs. 1 and 2). The tops of these spaces 25 are shown as stuffed with paper 26 (Fig. 1) just at the top edges of the several cells, thus providing a uniform surface for receiving the sealing disc 24, of insulating material, in proper position. When all the members are placed in position, the lead 19 of the electrical circuit is connected to the casing 10 and to the lamp socket 27, both the said socket and the lamp 20 being held in position by the leads of the circuit, at which time the whole structure preferably is sealed, to prevent the structure from being tampered with. To describe the circuit more specifically, it will be noted that one end of the circuit is at the upper end of the core rod 33 which is capped at 35 by a metal contact member. This contact member 35 is the first terminal in the circuit. The first lead of the circuit 19 goes from the cap 35 to the lower end of the lamp socket 27. The other lead of the circuit extends from the lamp socket 27 to the casing 10. This is shown in Fig. 3. In Fig. 1 the point of the contact of the second lead of the circuit 19 and the casing 10 is not shown. The disc 24 preferably is formed from molten, insulating material, poured into place; and after the paper or the like is placed in the spaces 25, the sealing compound is poured over the paper, thereby sealing in position all the cells and the circuit, including the projection 23 which holds the container 17 rigidly in position with respect to the remainder of the device, thereby completing a sealed-in, self-contained device which is always ready for emergency service.

The container 17 for the electrolyte prevents the contents thereof from energizing the cells and ensures infinite shelf-life of the device before the lamp or other lead is brought into use.

When the container 17 is broken, the electrotype flows to the absorbent material 28 which is shown as being located between the negative and positive electrodes 29 and 30 of each cell. The absorbent material is shown as being in the form of a sack 31 enclosing and covering the positive electrode 30, which may be formed of carbon granules 32, excepting for that portion of the core rod 33, which may be of solid carbon, which extends through the hole 34 in the sack 31. The rod 33 preferably is provided with a metal contact cap 35 forming a terminal of the electrical circuit. The lower end of the sack preferably is tied in position at 36, the fluffed or spread end of the sack forming an absorbing pad 37 to facilitate absorption of the electrolytic fluid. Of course any other suitable form of covering could be used if desired.

Each cell preferably has absorbent material located between the electrodes thereof, and each cell preferably has an absorbing pad 37 resting on the bottom of the casing. Just sufficient electrolytic fluid is placed initially in the container to saturate all the absorbing material between the electrodes of the cells, so that the casing is left absolutely clear of free liquid, thereby disconnecting the several cells so that the voltage across the electrical circuit will depend entirely upon the summation of the E. M. F.'s of the separate cells, minus the resistance drop in the leads of the circuit.

When the molten sealing disc commences to harden in situ, the outer globe 38 should be placed in position in the hardening material, which cements the globe rigidly in position.

In operation, the lamp, generator and container of electrolyte are self-contained in a casing and globe, ready for use at all times for emergency service, with an infinite shelf-life, which will ensure against deterioration of the cells and the local action between them which tends to destroy the said cells. The main embodiment of the invention lies in energizing the electrical circuit by breaking the container, allowing the electrolyte to be absorbed by an absorptive material located between the electrodes of the cells in sufficient amount to absorb all the electrolyte, so that the cells are disconnected through the electrolyte.

When all the elements are placed in position, the spaces 25 between them are filled, and the molten insulating disc 24 is poured over the padding 26, securely sealing in all the elements, after which the globe is placed on the disc and is cemented in position, making a self-contained device.

It is to be noted that when my device is brought into its energized condition, there cannot possibly be any sparking, so that the device is absolutely safe.

It is obvious that once the broad details of my invention are disclosed, many modifications and adaptations will readily occur to those skilled in the art, all falling within the ambit of my invention. Accordingly, I intend that my invention be limited only by the scope of the appended claims.

I claim:

1. An electrical generator assembly, comprising a casing, a plurality of separate cell units, insulated from each other and disposed in said casing, positive and negative electrodes, spaced from each other, for each cell unit, said cell units each having an opening thereinto, absorbent material disposed in each cell unit between said electrodes and extending outwardly through said openings and resting on the bottom of said casing, said cell units being connected in series, a liquid-tight, frangible container in said casing, common to all said cell units, a liquid electrolyte sealed in said container, said openings in said cell units all being adjacent said container at all times, and deformable means forming part of said casing for breaking said container at will, and for indicating by its deformation that the container has been broken, the electrolyte when the container is broken flowing out of it and being absorbed completely by the absorbent material, whereby the cell units are electrically separate from any electrolyte common to the several units, each unit becoming energized and completing an energized circuit through said series-connected cell units.

2. An electrical generator assembly, comprising a casing, a plurality of separate cell units, insulated from each other and disposed in said casing, positive and negative electrodes, spaced from each other, for each cell unit, said cell units each having an opening thereinto, absorbent material disposed in each cell unit between said electrodes and extending outwardly through said openings and resting on the bottom of said casing, said cell units being connected in series, a liquid-tight, frangible container in said casing, common to all said cell units, a liquid electrolyte sealed in said container, said openings in said cell units all being adjacent said container at all times, deformable means forming part of said casing for breaking said container at will, and for indicating by its deformation that the container has been broken, the electrolyte when the container is broken flowing out of it and being absorbed completely by the absorbent material, whereby the cell units are electrically separate from any electrolyte common to the several units, each unit becoming energized and completing an energized circuit through said series-connected cell units and means sealing the cell units and container in position, to form a self-contained assembly.

3. An electrical generator assembly, comprising a casing, a plurality of separate cell units, insulated from each other and disposed in said casing, positive and negative electrodes, spaced from each other, for each cell unit, said cell units each having an opening thereinto, absorbent material disposed in each cell unit between said electrodes and extending outwardly through said openings and resting on the bottom of said casing, said cell units being connected in series, a liquid-tight, frangible container in said casing, common to all said cell units, an upwardly extending projection on the top of said container, a liquid electrolyte sealed in said container, padding forming supports in the spaces between the cell units and around said projection, to present a substantially continuous top surface for the cell units in said casing, said openings in said cell units all being adjacent said container, deformable means forming part of said casing for breaking said container at will, and for indicating by its deformation that the container has been broken, the electrolyte when the container is broken, flowing out of it and being absorbed completely by the absorbent material, whereby the cell units are electrically separate from any electrolyte common to the several units, each unit becoming energized and completing an energized circuit through said series-connected cell units, and a sealing insulating compound poured in molten form over the padding and cell units to form, when it has hardened, a covering disc securely holding the cell units and projection in position in a self-contained assembly.

4. An electrical generator assembly, comprising a casing, a plurality of series-connected cell units in said casing, a single frangible container in said casing, common to all said cell units, a liquid electrolyte in said container, means for breaking said container and releasing the liquid electrolyte at the will of the user so that it can flow from said container to said cell units to energize the latter substantially simultaneously, absorbent material in each cell unit for so completely absorbing all the electrolyte that there will be no residual electrolyte common to the cell units, and insulating material around each cell unit, so that each cell unit is electrically independent of the others, the storing of the electrolyte apart from the cell units resulting in infinite shelf-life for the assembly until the assembly is brought into operation.

5. An electrical generator assembly, comprising a casing, a plurality of separate cell units, insulated from each other and disposed in said casing, said cell units each having an opening thereinto, said cell units being connected in series, a frangible liquid-tight container within said casing substantially equi-distant from each of said cell units, a liquid electrolyte sealed in said container, said openings in said cell units all being adjacent said container at all times, and means operable at will for breaking said container and releasing the electrolyte therefrom so that it can flow into said cell units, to energize the latter simultaneously and to complete an energized circuit through said series-connected cell units, the said cell units being disposed about the container in the manner of a circle, and the said container being disposed in the approximate center of said circle.

6. An electrical generator assembly, comprising a casing, a plurality of separate cell units, insulating material disposed between said cell units, said cell units being disposed within said casing and connected in series, a frangible liquid-tight container within said casing, said container being substantially equi-distant from each of said cell units, a liquid electrolyte sealed in said container, each of said cell units having an opening into said casing, and absorbent means in each of said cell units and respective openings, whereby breaking of said frangible container and release of said electrolyte the latter is completely absorbed substantially simultaneously in said cell units to energize them and complete an energized circuit therethrough.

7. An electrical generator assembly, comprising a casing, a plurality of series-connected cell units within said casing, a single frangible container within said casing disposed substantially equi-distant from each of said cell units, a liquid electrolyte sealed in said container, and means for breaking said frangible container to release the electrolyte so that it can flow to all said cell units to energize the latter substantially instantly and simultaneously, the storing of the electrolyte apart from the cell units resulting in infinite shelf-life for said assembly until the frangible container is broken.

GUNNAR A. F. WINCKLER.